Sept. 9, 1952 F. M. STELLA 2,610,235
HORN BLOWING APPARATUS FOR MOTOR VEHICLES
Filed March 11, 1949 4 Sheets-Sheet 1

INVENTOR.
FRANK M. STELLA.
BY
ATTORNEY.

INVENTOR.
FRANK M. STELLA.
BY Samuel Weedman
ATTORNEY.

Sept. 9, 1952 F. M. STELLA 2,610,235
HORN BLOWING APPARATUS FOR MOTOR VEHICLES
Filed March 11, 1949 4 Sheets-Sheet 3

INVENTOR.
FRANK M. STELLA.
BY
ATTORNEY.

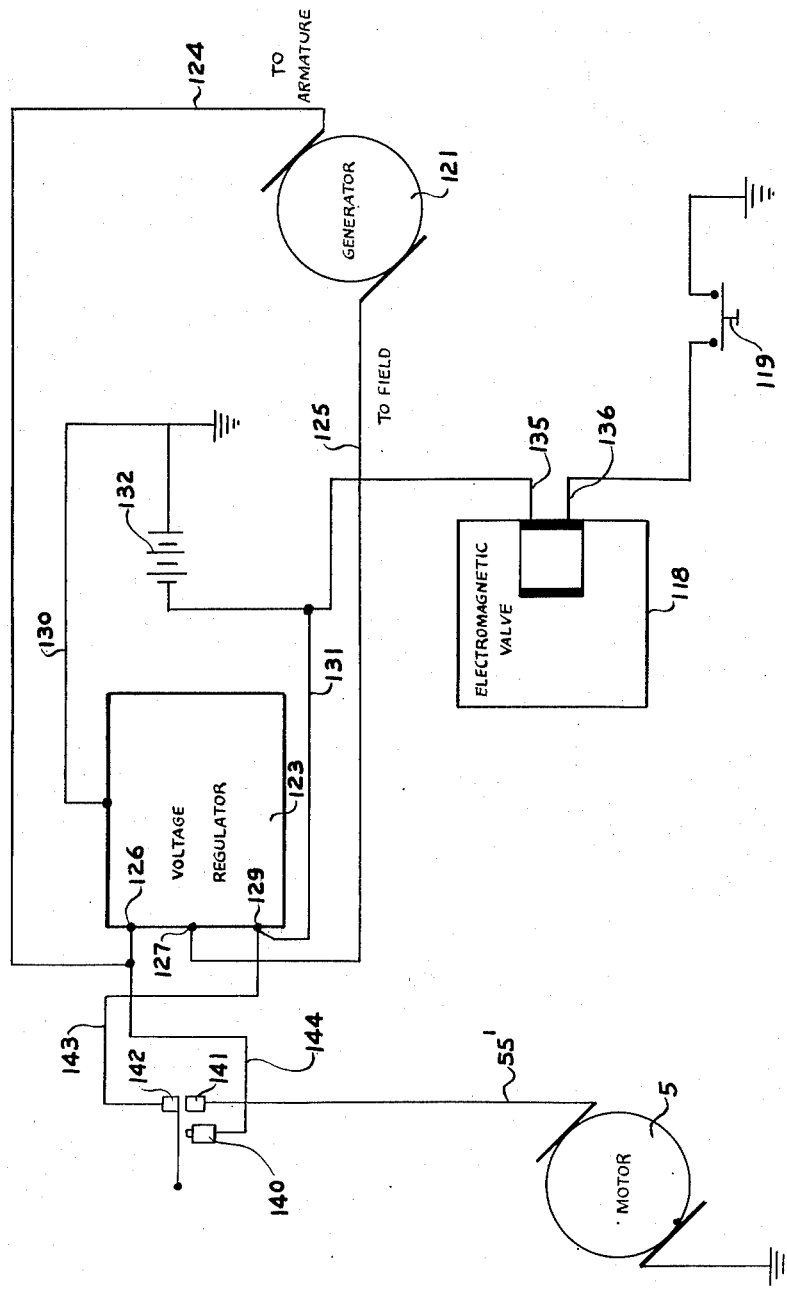

Patented Sept. 9, 1952

2,610,235

UNITED STATES PATENT OFFICE 2,610,235

HORN BLOWING APPARATUS FOR MOTOR VEHICLES

Frank M. Stella, Detroit, Mich., assignor to Power Brake Parts Manufacturing Company, Detroit, Mich., a corporation of Michigan Application March 11, 1949, Serial No. 80,889

2 Claims. (Cl. 177—8)

The present invention pertains to a novel horn blowing apparatus for a motor vehicle, particularly motor trucks.

It is well known in the art that such vehicles require powerful horns which in many cases are operated by compressed air. Such installations require an air storage tank and a compressor to supply it. The compressor in some present installations is operated by the vacuum in the intake manifold. The suction-operated compressor has proved unsatisfactory under certain conditions, for example, when the engine is working under heavy load and there is little reduction of pressure in the manifold.

One of the objects of this invention is to eliminate the objections of a suction-driven compressor and to provide a more positive and reliable drive. This object is accomplished generally by providing an electric motor for driving the compressor. An electric motor, however, raises problems of current supply and battery drainage. Another object of the invention in this connection is to provide an electrical system that avoids drainage of the battery and also gives the electric motor a higher amperage.

In the accomplishment of the latter object, the circuit of the electric motor is governed by a normally open relay which must be closed in order to make current available to the motor. The energizing coil that closes the relay receives its current from the conventional generator of the vehicle. Consequently the relay is closed only when the generator is running, and the electric motor cannot drain the battery. Further, with the generator in operation, the motor receives a somewhat higher voltage and a substantially higher amperage than can be delivered by the battery.

Another object of the invention is to control the motor circuit by the air pressure in the storage tank. In this connection the motor circuit includes a snap action switch that is opened when a predetermined pressure is attained in the tank. In one embodiment of the invention it is desired to reduce the pressure in the compressor when the electric motor is stopped, in order to enable easier starting of the mtor. For this purpose a bleeder valve is opened by the snap action mechanism when the latter opens its switch.

The invention is fully disclosed by way of example in the following description and in the accompanying drawings in which:

Figure 6 is an electrical wiring diagram.

Reference to these views will now be made by use of like characters which are employed to designate corresponding parts throughout.

Figure 1:
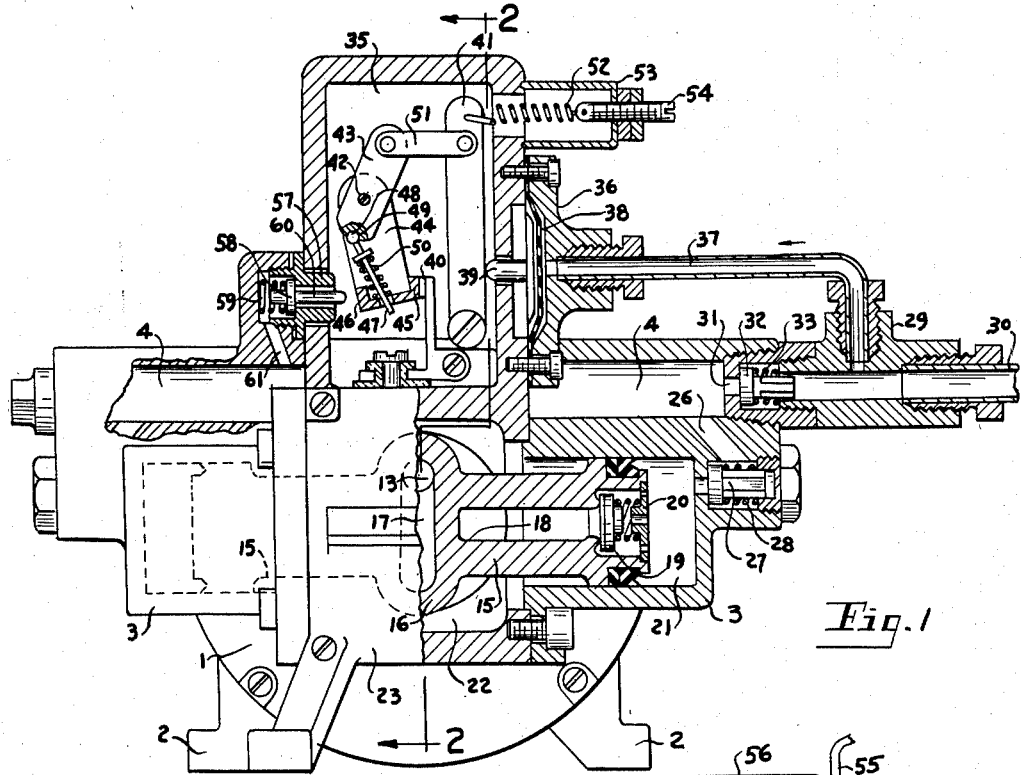
Figure 1 is a longitudinal section of the device.
Figure 2:
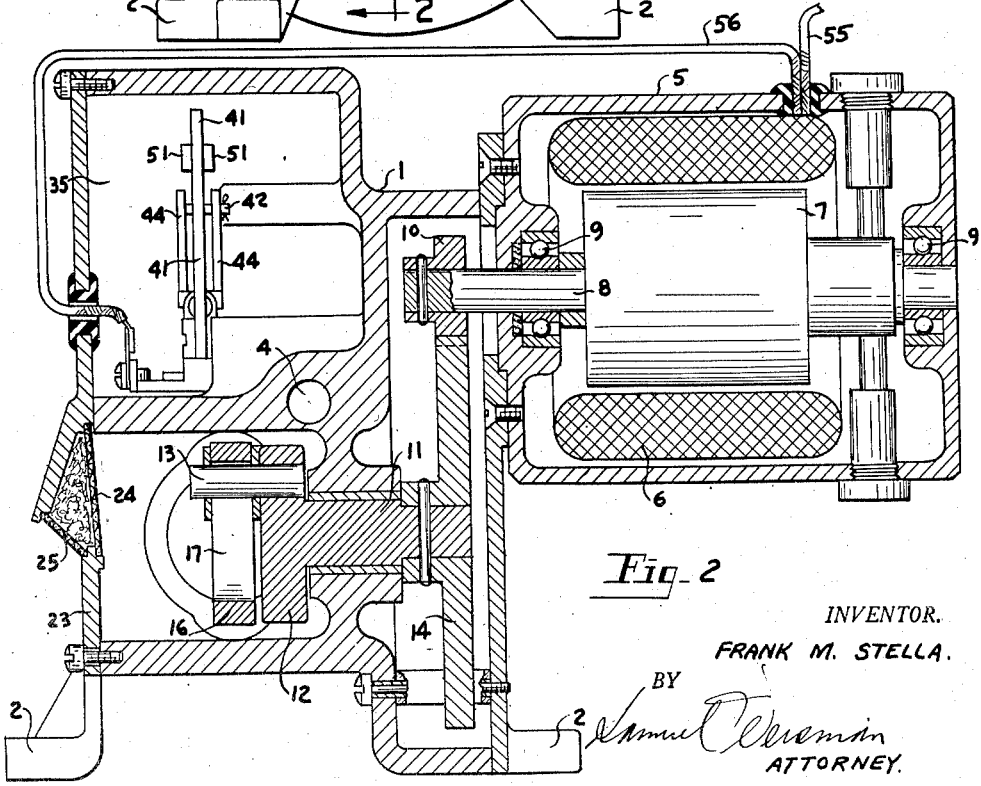
Figure 2 is a section in the line 2—2 of Figure 1.

The pumping apparatus is built in a housing 1 standing on feet 2. The housing is formed with a horizontal cylinder 3 and with a parallel bore 4 constituting a manifold as will presently be shown.

A motor casing 5 is attached to the back of the housing 1. The motor contained therein comprises a winding 6 and a rotor 7 having a horizontal shaft 8 mounted in ball bearings 9 and extending into the housing 1. The shaft 8 is there provided with a driving pinion 10 geared to a pump which will now be described.

In the housing 1, adjacent to the cylinder 3, is journalled a shaft 11 formed with a disk 12 from which extends an eccentric pin 13. The shaft 11 also carried a large gear 14 meshing with the pinion 10. In the cylinder 3 is mounted a double piston 15 formed with an intermediate enlarged section 16 which has a vertical slot 17 receiving the pin 13. The cylinder 3 is in fact a pair of sections secured to opposite sides of the housing 1 and receiving respectively the ends of the piston 15. At each side of the enlargement 16, the piston is formed with a chamber 18 extending through the corresponding end of the piston where it is fitted with on inwardly closing check valve 19 and a retainer 20. The ends of the piston are fitted with packing rings that ride on the cylinder wall.

The chamber 22 containing the crosshead 16 is covered by a separate front plate 23 having an air intake opening 24 overlaid with filtering material 25. Air drawn into the chamber by the suction of the piston heads flows into the laterally open cavities 21. As an end of the piston moves toward the chamber 22, the air flows past the open check valve 19 into the end of the cylinder. On reversal of the piston, the check valve closes and the air is compressed against the adjacent end of the cylinder.

Each end of the cylinder is connected to the manifold 4 by an angular port 26. Each port is fitted with a check valve 27 closed inwardly by a spring 28.

The fitting 29 is connected to one end of the manifold 4 and to a line 30 leading to an air storage tank. The fitting is formed with a port 31 controlled by a check valve 32 which closes inwardly under the action of a spring 33. Thus, in order to charge the tank, the compressed air must overcome the spring 28. The spring 33 is lighter and merely prevents back flow from the tank under conditions that will presently be described.

An upper chamber 35 is formed in the housing 1 and substantially opposite the motor casing 5. At the chamber 35 a fitting 36 is secured to the housing and is connected by a pipe 37 to the fitting 29 at a point between the valve 32 and the line 30. The fitting 36 contains a diaphragm 38 exposed to the pipe 37 and having a finger 39 extending into the chamber 35 for a purpose that will presently be described. The chamber 35 is open to atmosphere.

To the bottom of the chamber 35 is secured a switch contact 40 which is insulated from the housing. Adjacent to the contact is pivotally mounted an upright lever 41, and adjacent to the lever is a shaft 42 on which is mounted a rocker arm 43. The yoke 44 is pivotally suspended from the shaft 42 and carries the complementary contact 45 and a trip finger 46 for a purpose that will presently be described. A pin 47 passes slidably through the bottom of the yoke and is formed at its upper end with a ball 48 received in a socket 49 shaped in the lower end of the rocker arm 43. A coil spring 50 surrounds the pin 47 and bears on the bottom of the yoke. The upper end of the rocker arm is joined to the upper end of the lever 41 by links 51.

The lever 41 is engaged near its lower end by the finger 39 and has its upper end attached to a tension spring 52. The spring extends into a sleeve 53 in which is threaded an axial screw 54 also attached to the spring 52 for adjusting the latter.

When the air pressure in the storage tank is sufficient to overcome the spring 52, the diaphragm 38 and the finger 39 move the lever 41 towards the shaft 42, thereby swinging the socket end of the rocker arm 43 toward the switch contacts. The pin 47 eventually slopes downward away from the contacts, and the spring 50 effects a snap action that separates the contact 45 from the contact 40 and thus opens the circuit. This circuit includes a conductor 55 from the grounded battery to the motor and another conductor 56 from the motor to the contact 40. When the tank pressure falls to a point where it no longer overcomes the spring 52, the switch contacts are again closed to operate the motor which drives the compressor.

Opposite the finger 46, a fitting 57 is mounted in the housing 1 and is normally closed inwardly by a check valve 58 backed by a spring 59 and having a stem 60 extending into the path of the finger 46. The manifold 4 communicates with the fitting 57, behind the valve 58, through a port 61.

When the switch 40, 45 opens as above described, the trip finger 46 opens the valve 58 and the port 61, however, is closed by the valve 32 under the tank pressure. The pressure in the manifold 4 is reduced to atmospheric through the chamber 35. The pump and motor re-start against a reduced load, and the motor thereby given time to develop speed.

Figure 3:
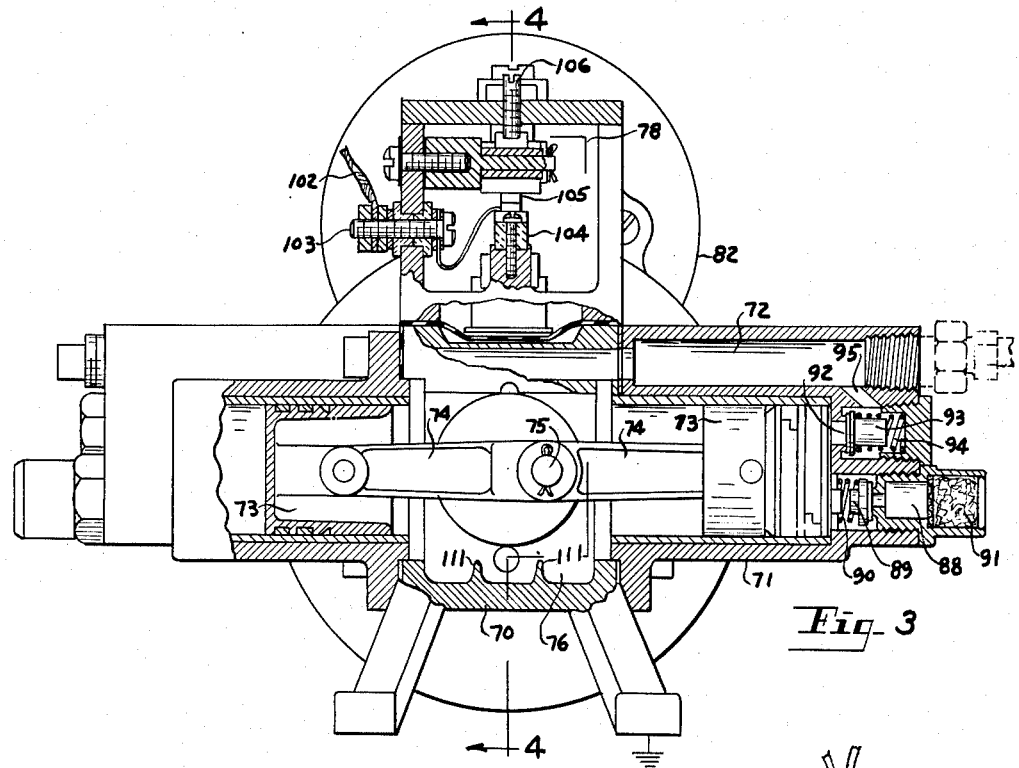
Figure 3 is a longitudinal section of a modification.
Figure 4:
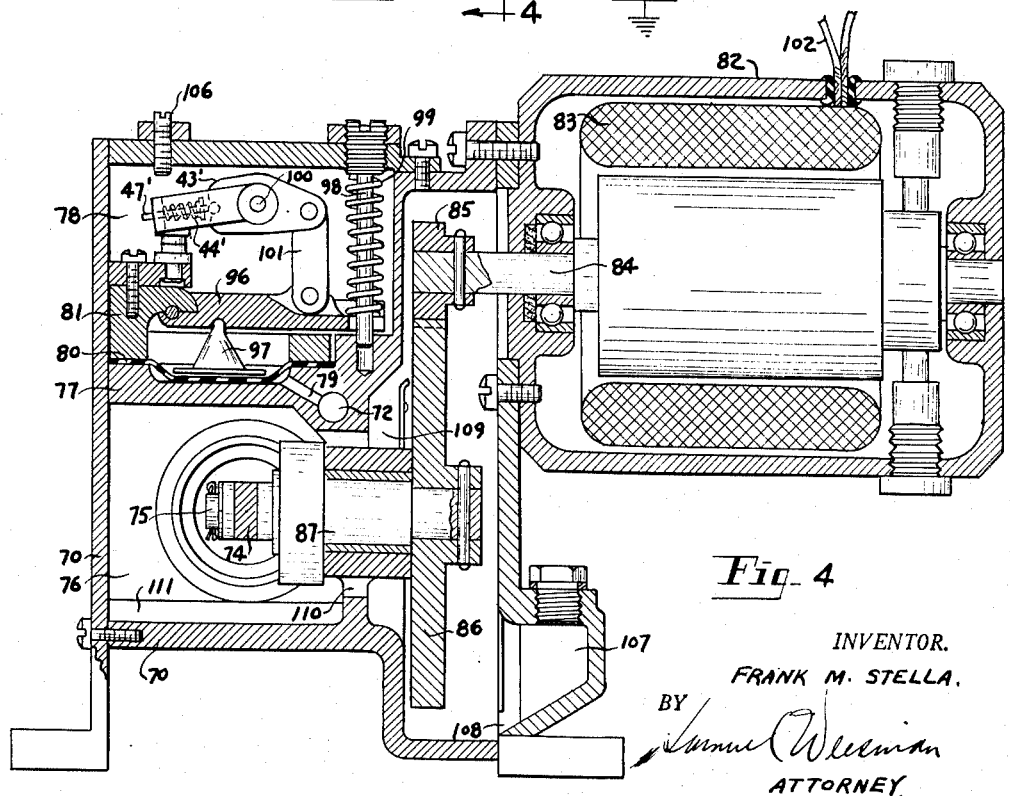
Figure 4 is a section on the line 4—4 of Figure 3.
Figure 5:
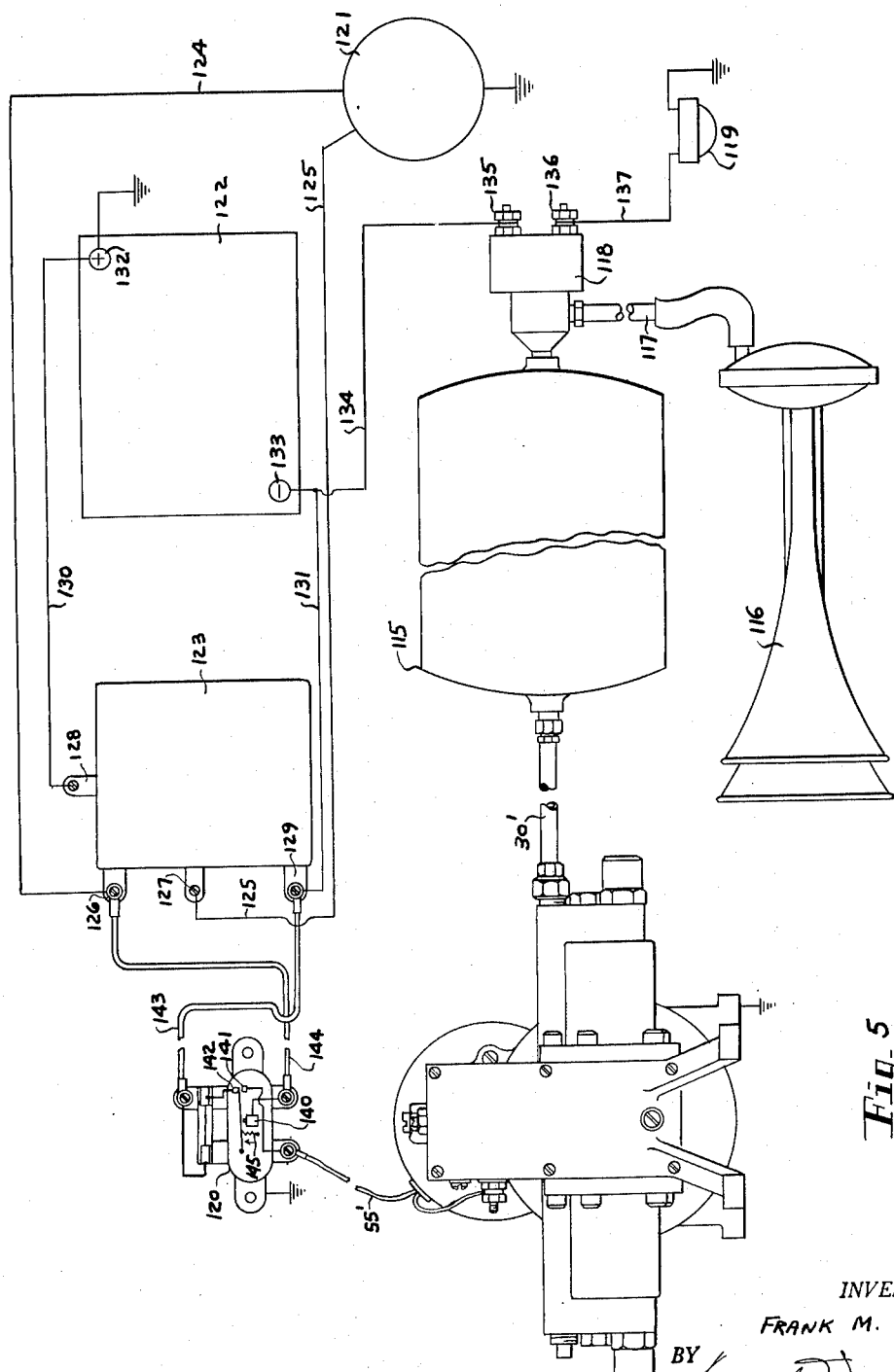
Figure 5 is a wiring diagram, showing also some of the mechanical parts schematically.

In the modification shown in Figures 3 and 4 the housing 70 is likewise formed with a cylinder 71 and a parallel manifold 72. The ends of the cylinder contain pistons 73 joined by pivoted connecting rods 74 to a crank 75 journalled in a chamber 76 between the ends of the cylinders.

Over the top wall 77 of the chamber 76 is another chamber 78 communicating with the manifold 72 through a port 79. A diaphragm 80 is clamped against the top 77 by a ring 81 and is exposed laterally to the port 79.

To the back of the housing 70 is fastened a motor casing 82 containing a motor 83 as previously described. The shaft 84 of the motor carries a pinion 85 meshing with a gear 86 on the shaft 87 of the crank 75.

Each end of the cylinder 71 has an intake port 88 covered by a check valve 89 closing outwardly by a spring 90. Each port 88 is also covered by a filter 91. Each end of the cylinder also has an outlet port 92 fitted with a check valve 93 which closes inwardly by a spring 94. Behind the head of the check valve, each port 92 communicates with the manifold 72 through a port 95.

To the ring 81 is pivotally attached one end of an arm 96 carrying a button 97 which bears upon the diaphragm 80. A pin 98 threaded in the top of the chamber 78 passes loosely through the other end of the arm 96 and is surrounded by a coil spring 99 bearing upon this end. The pressure of the spring 99 is regulated by screwing the pin and determines the air pressure necessary to lift the diaphragm and the arm 96.

A shaft 100 is mounted in the walls of the chamber 78 near the top thereon and carries a rocker arm 43' similar to the member 43. One end of the rocker arm 43' is joined to the free end of the arm 96 by links 101. On the shaft 100 is pivotally mounted a yoke 44' carrying a snap action mechanism similar to that previously described and designated in part at the numeral 47'.

A conductor 102 from the motor is brought into the chamber 78 through an insulated post 103 and is fastened to an insulated fixed contact 104. The yoke 44' lies in a nearly horizontal position and carries the complementary contact 105 which is grounded through the housing. The top wall of the chamber 78 carries a differential adjustment screw 106 engageable by the yoke 44' on its upward movement. This screw regulates the switch-closing resistance of the spring in the snap action mechanism and hence the pressure at which the spring 99 will close the switch. For example, the spring 99 may permit the switch to open at 90 pounds but will close the switch at a desired lower pressure.

An oil sump 107 is formed at the base of the housing 70 adjacent to the gear 86 and communicates with the housing through a restricted splash-proof slot 108. The oil is thrown by the gears and enters the chamber 76 through an upper channel 109, returning to the sump through a lower port 110. Baffles 111 are formed on the bottom of the chamber 76 to reduce swashing.

In the wiring diagram, the compressed air line 30' is shown connected to the storage tank 115. The tank is connected to the horns 116 through a pipe 117 controlled by an electromagnetic valve 118 operated by a button 119.

The live conductor 55' leading to the electric motor is not connected directly to the battery but to the output side of an electromagnetic relay 120. The diagram also shows the conventional generator 121, battery 122 and voltage regulator 123 carried on the vehicle.

The terminals of the generator are connected by conductors 124 and 125 respectively to the armature post 126 and field post 127 of the voltage regulator. Battery posts 128 and 129 on the regulator are connected by conductors 130 and 131 respectively to the positive and negative terminals 132 and 133 of the battery. The conductor 124 is grounded through the generator. The terminal 133 is connected by a wire 134 to a terminal 135 of the coil of valve 118, the other terminal 136 being grounded through the horn button 119 by a conductor 137.

The relay 120 is energized and closed only by current from the generator, whereupon the conductor 55' receives current from the grounded battery. Since the generator is always turning over when the engine is running, whether the battery is taken current or not, the electric motor will operate the compressor while the engine and generator are running and not otherwise. When the engine is not running, the horns can be blow until the storage tank is exhausted, but the electric motor will not start and will not drain the battery. Another advantage of this system is that the horns are operated on 6½ to 7½ volts and 18 to 40 amperes available from the generator as compared with 6 volts and a lower amperage from the battery alone.

With reference to the relay in detail, it includes an actuating element or coil 140 grounded at 140', a fixed contact 141 connected to the conductor 55', and a movable contact 142 joined by a conductor 143 to the battery post 129. The coil 140 is connected by a conductor 144 to the post 126 which, as previously shown, is connected to the generator by the conductor 124. A spring 145 normally separates the contact 142 from the contact 141. Regardless of the condition of the voltage regulator, the coil 140 is energized to make current available to the electric motor through the contacts 141, 142.

The grounded generator 121, when driven by the engine, charges the grounded battery 122 through conductor 125, voltage regulator 123, conductor 130 and ground. The running generator energizes the relay coil 140 through conductor 124, post 126, conductor 144 and ground, thus closing contacts 141, 142. Battery current is supplied to the motor 5 from terminal 133, through conductor 131, post 129, conductor 143, contacts 142 and 141, conductor 55' and ground.

The horns 116 are operated on opening of the valve 118. This valve is opened by pushing the button 119 which completes a grounded circuit from battery terminal 133 through conductor 134, posts 155 and 136, and conductor 137.

Although a specific embodiment of the invention has been illustrated and described, it will be understood that various alterations in the details of construction may be made without departing from the scope of the invention as indicated by the appended claims.

What I claim is:

1. A horn blowing apparatus for motor vehicles comprising, in combination with a generator adapted to be driven by the engine of a vehicle and an air horn for mounting on the vehicle, a compressor connected to said horn to furnish compressed air for blowing the horn, means for controlling the flow of compressed air to said horn, an electric motor for driving said compressor, an electric circuit connected to deliver current to said motor, a normally open relay connected into said circuit, said relay having a circuit-closing coil electrically connected to the current output side of said generator, whereby said motor is operated only when said engine is running.

2. A horn blowing apparatus for motor vehicles comprising, in combination with a generator adapted to be driven by the engine of a vehicle, a battery and an air horn for mounting on the vehicle, a compressor connected to said horn to provide compressed air for blowing said horn, means for controlling the flow of compressed air to said horn, an electric motor for driving said compressor, a normally open relay having contacts connected respectively to said motor and battery, said relay having a circuit-closing coil electrically connected to the current output side of said generator, whereby said motor is operated only when said engine is running.

FRANK M. STELLA.

REFERENCES CITED

The following references are of record in the file of this patent:

UNITED STATES PATENTS

| Number | Name | Date |
| --- | --- | --- |
| 2,240,595 | White | May 6, 1941 |
| 2,336,762 | White | Dec. 14, 1943 |
| 2,337,788 | White | Dec. 23, 1943 |
| 2,345,797 | Corson | Apr. 4, 1944 |
| 2,389,348 | Dustin | Nov. 20, 1945 |

FOREIGN PATENTS

| Number | Country | Date |
| --- | --- | --- |
| 462,205 | France | Nov. 17, 1913 |